United States Patent [19]
Airey

[11] 3,806,302
[45] Apr. 23, 1974

[54] ISOSTATIC MOLDING MACHINE

[75] Inventor: Keith Airey, Sunderland, England

[73] Assignee: Olin Energy Systems Ltd., Sunderland, England

[22] Filed: May 4, 1972

[21] Appl. No.: 250,127

[30] Foreign Application Priority Data
Nov. 2, 1971 Great Britain.............. 41661/70

[52] U.S. Cl........ 425/405 H, 425/261, 425/DIG. 44
[51] Int. Cl.......................... B30b 5/02, B30b 11/00
[58] Field of Search.................... 425/405, 405 H

[56] References Cited
UNITED STATES PATENTS

| | | | |
|---|---|---|---|
| 3,319,292 | 5/1967 | Witkin | 425/405 H |
| 2,290,910 | 7/1942 | Jeffery | 425/405 H UX |
| 3,193,900 | 7/1965 | Wendt | 425/405 H |
| 3,677,674 | 7/1972 | Bowles | 425/405 H UX |
| 3,730,666 | 5/1973 | Bowles | 425/405 H |
| R20,460 | 8/1937 | Jeffery | 425/405 H UX |
| 3,618,164 | 11/1971 | Rietmann | 425/405 H X |
| 3,172,153 | 3/1965 | Loomis et al. | 425/405 H UX |
| 3,550,198 | 12/1970 | Roberts | 425/405 H UX |
| 3,477,096 | 11/1969 | Bowles et al. | 425/405 H |
| 3,593,373 | 7/1971 | Loomis | 425/405 H UX |

*Primary Examiner*—J. Howard Flint, Jr.
*Attorney, Agent, or Firm*—Donald R. Motsko; William W. Jones; H. Samuel Kieser

[57] ABSTRACT

Apparatus for compacting particulate material into a coherant body by the dry bag technique. The apparatus includes a number of molding assemblies which are mounted on a support. The support is movable and moves the molding assemblies between a plurality of work stations, including a filling station, a compacting station, and an unloading station. Production of bodies is continuous and automatic, there being one molding assembly at each work station at all times during the forming cycle.

5 Claims, 15 Drawing Figures

ISOSTATIC MOLDING MACHINE

This invention relates to an apparatus for isostatically pressing particulate material into discrete bodies using the "dry bag" pressing technique, the apparatus having a fully automated working cycle.

It is well known in the prior art to form discrete bodies of various forms by confining a charge of particulate material in a mold of desired shape, and subjecting the confined charge to an externally supplied source of fluid pressure to compact the particulate material into a coherent mass. One preferred way of forming such compacted bodies involves the use of a flexible bag of metal, rubber, or the like to form the side wall of the mold cavity. The outer surface of the flexible bag is directly subjected to the fluid pressure and the flexible bag is thus uniformly forced against the contained particulate charge to compact the latter. One version of this preferred mode involves placing the filled flexible bag in the operating fluid, removing the bag and compacted body from the operating fluid, and then opening the bag to remove the compacted body therefrom. In the art, this is known as the "wet bag" method of isostatic compaction. Alternatively, the flexible bag may be fixed in a mold body, the particulate material poured into the bag and compacted therein. The compacted body is then removed from the bag through an opening provided therein, but sealed during compaction, while the bag remains in the mold body. This latter method is known in the art as the "dry bag" method of isostatic compaction.

According to the present invention, there is provided a dry bag isostatic molding machine comprising indexing means for forwarding molds consecutively to a filling station including means for charging a mold therein with molding material, a compacting station including means for compressing a charge within a mold, and an unloading station including means for withdrawing a molded article from a mold.

Preferably the arrangement is such that the axes of the molds (the axes of the molds being the axes along which the molds are charged and discharged) are parallel to the rotary axis of the indexing station. With this arrangement it is desirable that the rotary axis is substantially vertical and the molds are charged and unloaded from the top. The compacting station then desirably has lifting means for lifting the mold to clamp it against a closure member.

According to another aspect of the invention, there is provided a dry-bag isostatic molding machine comprising means for forwarding isostatic molds consecutively to operating stations, the molds being readily removable and replaceable. With this arrangement the molds can be readily interchanged for servicing and for changing the form of the bag and thus the products produced.

The invention further provides an isostatic mold suitable for use in a machine according to the invention and comprising pump means for compressing fluid therein. More specifically, the mold may comprise a cylindrical casing, a molding bag disposed within the casing with its open end secured to the casing wall at one end thereof, a piston slidable in the other end of the cylinder and pressure-transmitting fluid filling the space between the piston and the bag. With this arrangement the pressure fluid (normally oil) can be selected for the required task and not, for example, its behaviour when pumped through pipelines. Furthermore, keeping the high pressure within the mold makes the arrangement much safer.

An isostatic molding machine constructed according to the invention is shown by way of example in the accompanying drawings in which.

Figure 1:
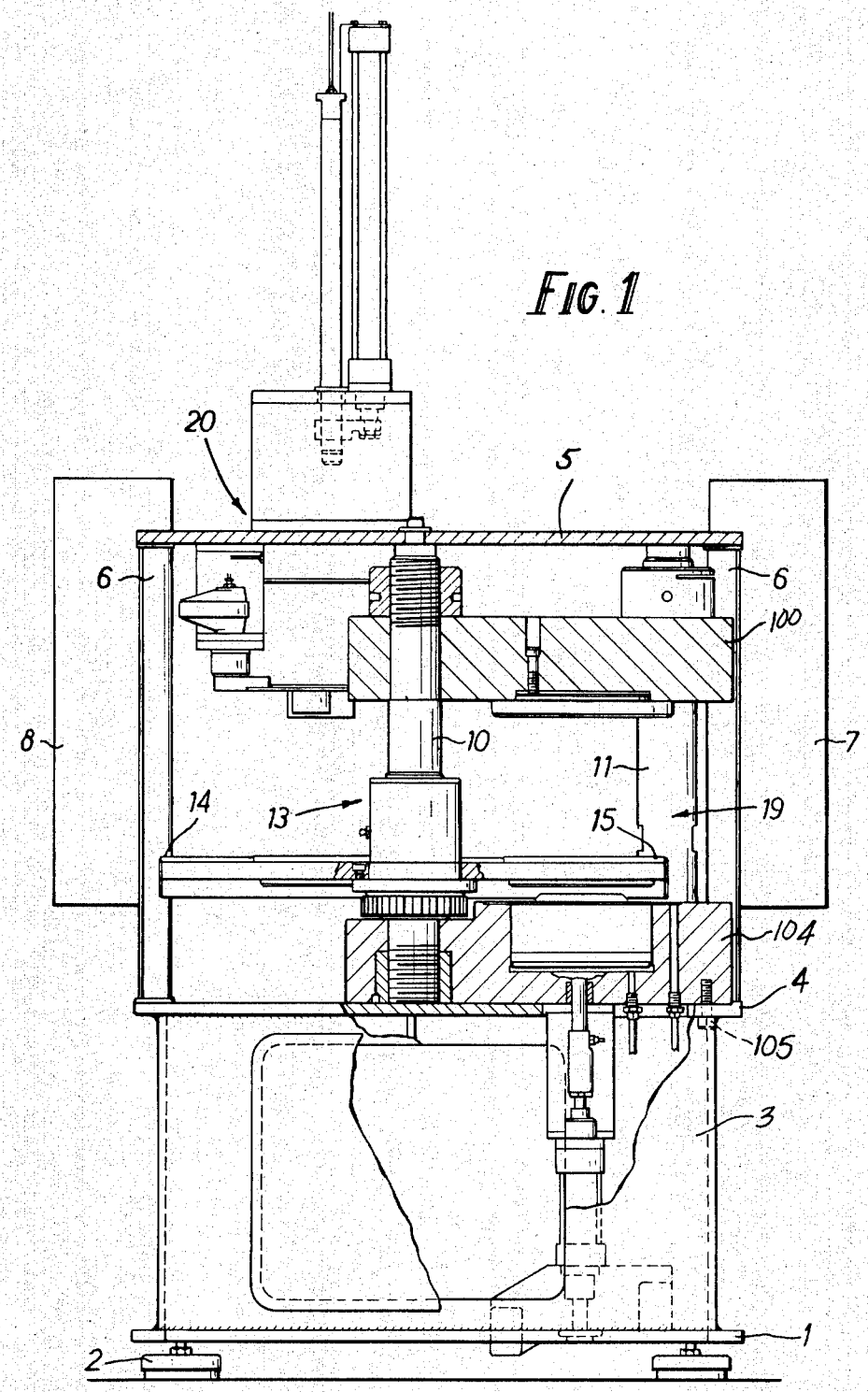
FIG. 1 is a vertical section of the machine (part is shown as a rear elevation) taken on the line I—I of FIG. 2.

The machine comprises a base 1 carried by feet 2 and carrying a lower housing shown generally at 3. The lower housing carries a bottom plate 4 and a top plate 5 interconnected by four corner posts 6. Two vertical boxes 7 and 8 have a photoelectric guard which extends across the front of the machine. Mounted between the plates 4 and 5 are a center post 10 and two peripheral posts 11 and 12.

A rotary hub on the center post 10 carries an indexing plate 14 apertured to receive three flanged bushes 15 disposed symmetrically around the table. These bushes 15 carry respective molds 16 during operation and are readily changed to suit particular molds. The hub 13 is driven by an indexing mechanism shown generally at 17. The indexing table 14 carries each mold 16 in turn to each of three stations, a filling station shown generally at 18, a compacting station shown generally at 19 and an unloading station shown generally at 20.

Figure 3:
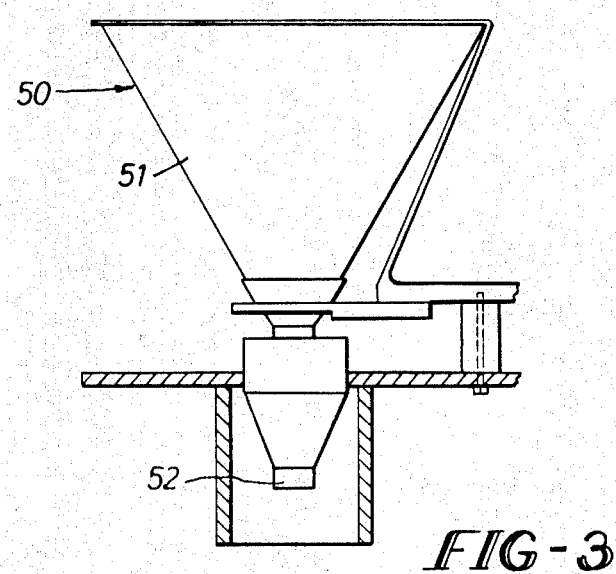
FIG. 3 is an elevation of the hopper of the machine.
Figure 4:
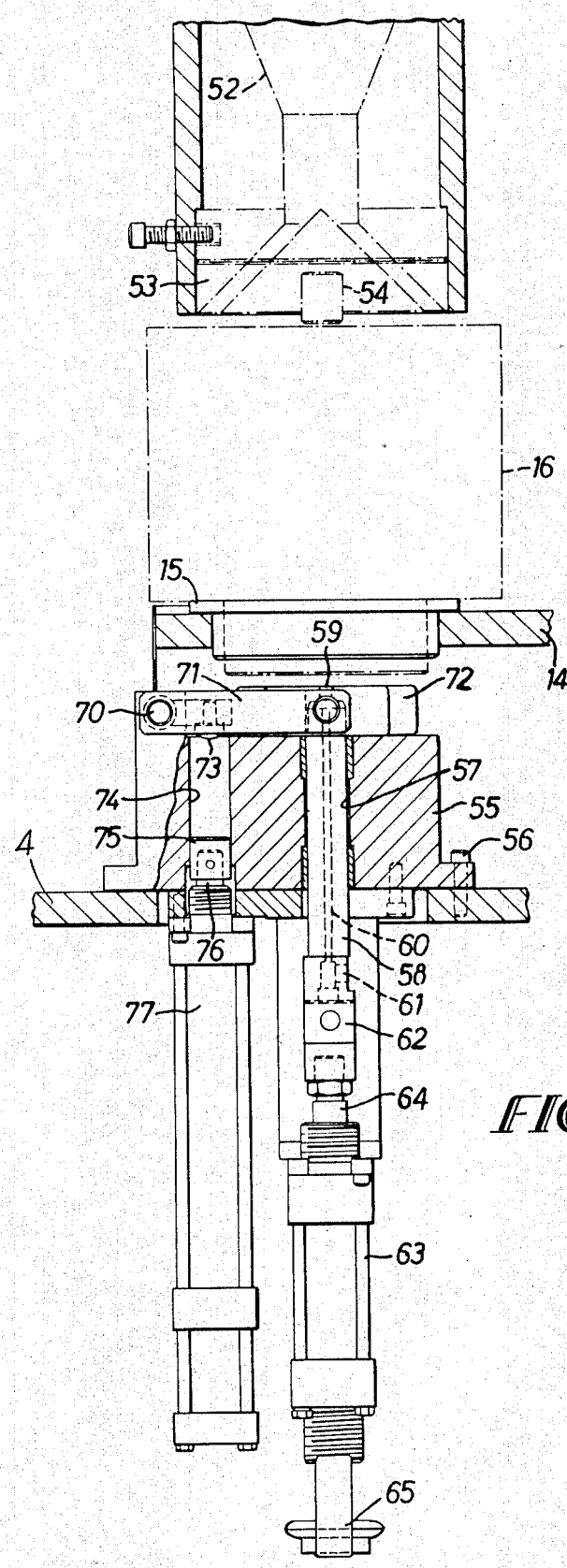
FIG. 4 is a part-sectional view of the lower part of the filling station shown on the line IV—IV of FIG. 2.

The filling station 18 is shown in FIGS. 3 and 4. FIG. 3 shows a conventional powder dispenser 50 which includes a hopper 51 and a delivery tube 52 arranged to deliver a given quantity of powder into a mold 16 at a given time in the cycle. The tube 52 is modified as shown at the top of FIG. 4 by an insert 53 which ensures that the powder is delivered to the mold 16 in an annular stream. The insert 53 has a locating pin 54 for engagement with the mold 16. A housing 55 secured by bolts 56 to the bottom plate 4 has a vertical bore 57 in which there is slidably mounted a plunger 58. The plunger 58 has a hollow probe 59 at its upper end and a communicating longitudinal bore 60 connected to a lateral bore 61 so that a vacuum can be applied to the outer mold cavity 260 (see FIG. 7) via probe 59. The plunger 58 is connected through a flexible linkage 62 to a pneumatic cylinder 63. The piston rod 64 of the cylinder 63 is arranged to operate a limit switch 65. Pivotally mounted on a pin 70 secured to the top of the housing 55 is a fork 71 between the ends of which is pivotally mounted a striker ring 72. An impact button 73 on the fork 71 is disposed above a bore 74 in the housing 55 which houses the head 75 of the piston 76 of a conventional impact cylinder 77.

Figure 2:
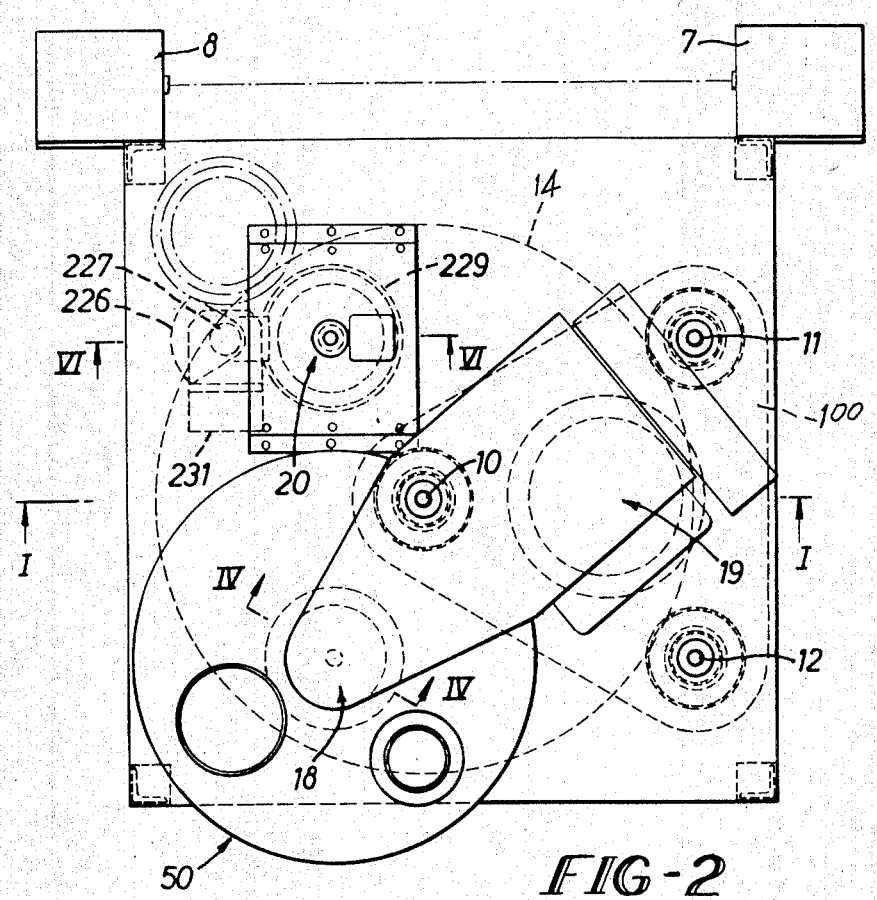
FIG. 2 is a plan view of the machine.
Figure 5:
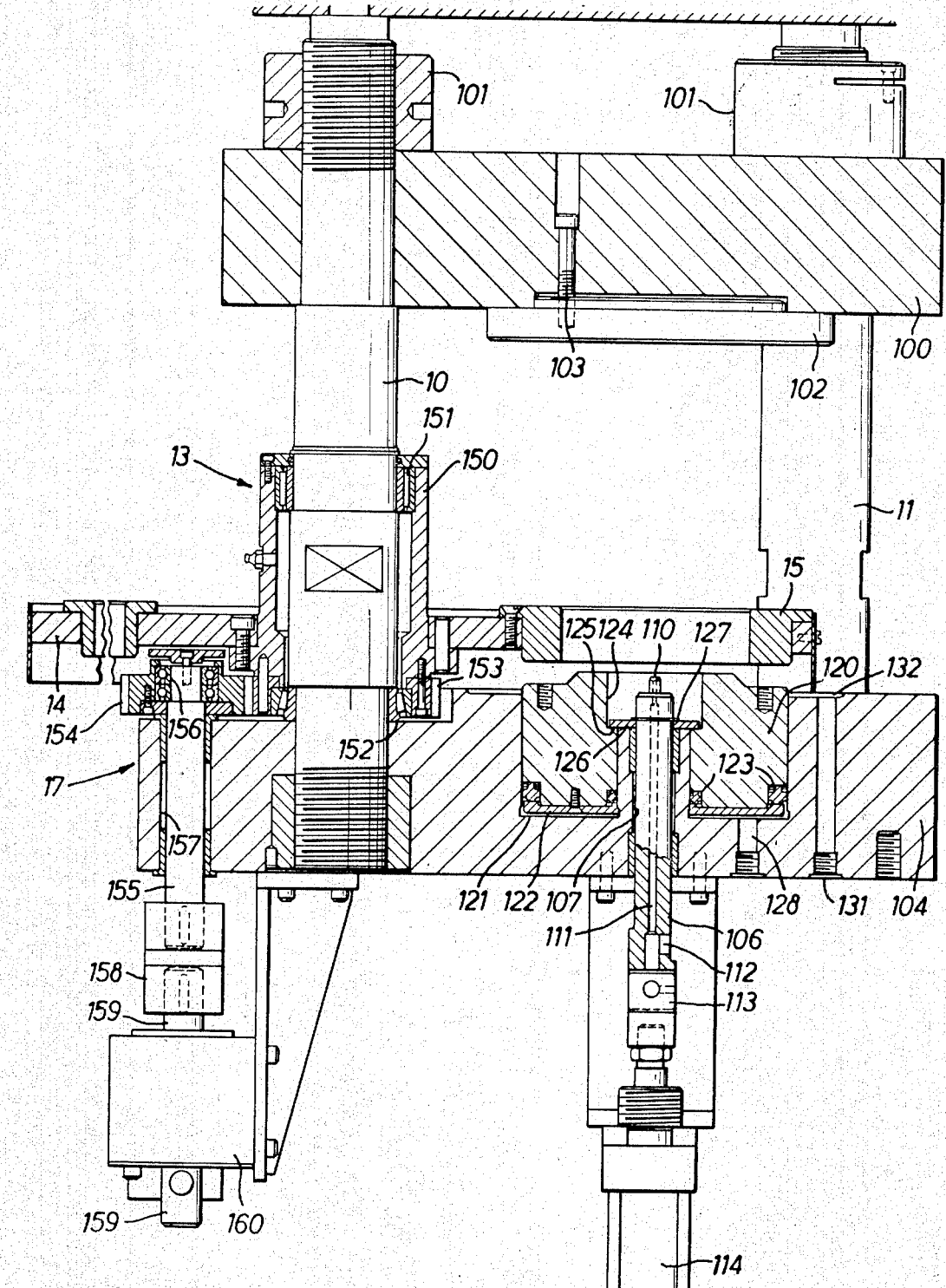
FIG. 5 is a more detailed view of the compacting station as shown in FIG. 1.
Figure 6:
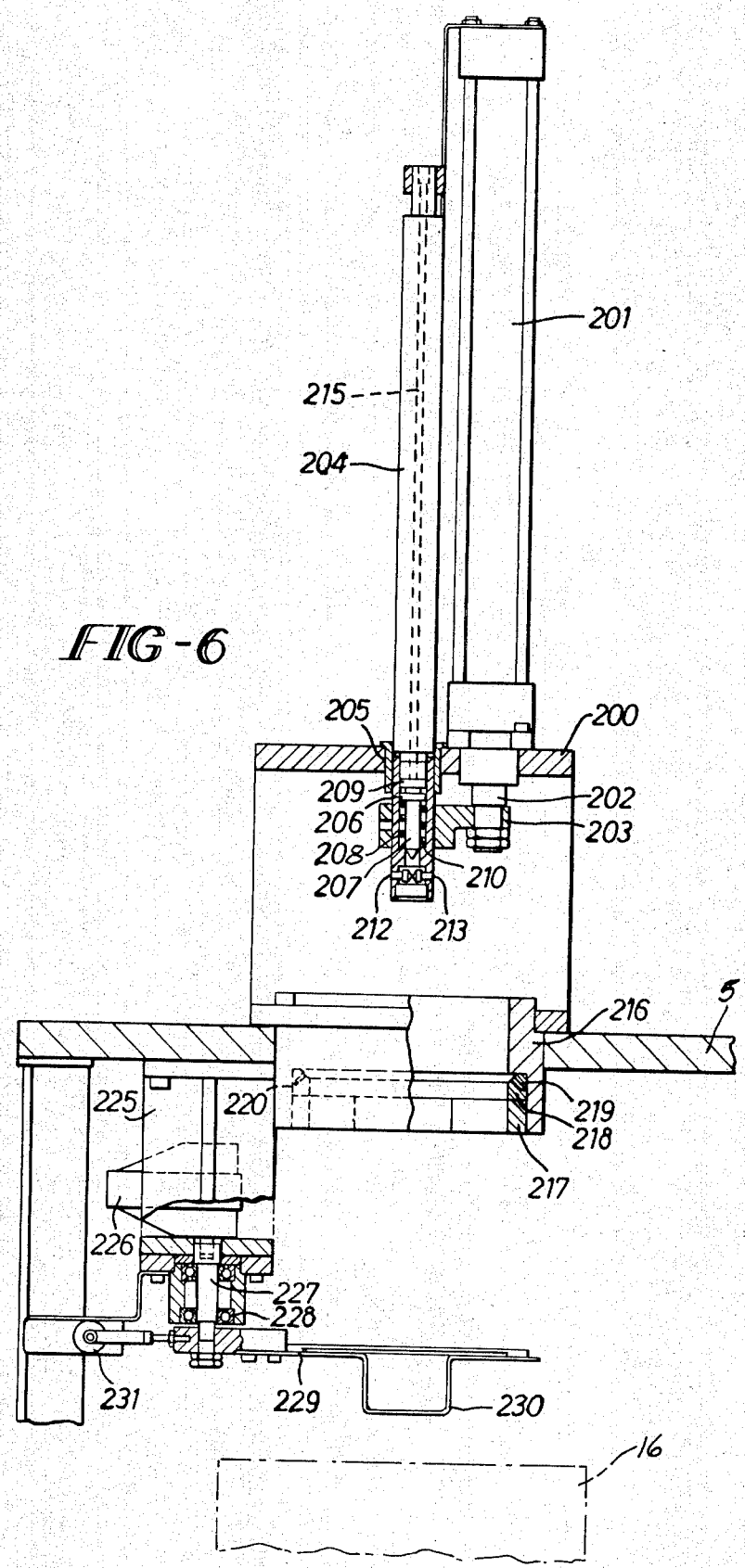
FIG. 6 is a part-sectional view of the unloading station taken on the line VI—VI of FIG. 2.

The compacting station 19 is shown most clearly in FIG. 5 but FIGS. 1 and 2 should also be referred to. Mounted on the stepped upper ends of the posts 10, 11 and 12 is a generally triangular upper bolster 100 which is secured in position by screwed collars 101 and carries a generally circular reaction plate 102 by means of a bolt 103. A similar lower bolster 104 is secured to the bottom plate 4 by bolts 105. A plunger 106, similar to the plunger 58, is slidably mounted in a vertical bore 107 in the bolster 104. Like the plunger 58 it has a hollow probe 110 at its upper end and a communicating longitudinal bore 111 connected to a lateral bore 112; this supplies vacuum and hydraulic pressure to the outer mold cavity 260. In a similar manner, it is connected through a flexible linkage 113 to a hydraulic cylinder 114, the piston rod 115 of which is arranged to operate limit switches 116 and 117. An annular piston 120 is vertically slidable in an annular recess 121 in the bolster 104 and has an annular end sealing plate 122 and respective peripheral seals 123. The piston 120 has a somewhat larger counterbore 124 in its upper end and this forms a ledge 125 for receiving a collar 126. A circlip 127 on the plunger 106 limits downward movement of the plunger 106 with respect to the piston 120 by engagement with the collar 126. Hydraulic fluid can be supplied to the recess 121 through a vertical bore 128 in the bolster 104. A drain 131 communicates with a depression 132 in the bolster 104 to carry off hydraulic fluid spillage.

The hub 13 comprises a cylindrical member 150 journalled by bearings 151 and 152 to the center post 10. The indexing mechanism 17 comprises a gear 153 which is bolted to the lower end of the member 150 and meshes with a pinion 154 carried by a shaft 155 through a free wheel coupling 156. The shaft 155 is mounted in a bore 157 in the bolster 104 and is connected through a flexible coupling 158 to the shaft 159 of a rotary actuator 160. The shaft 159 extends through the actuator 160 and has a projection adapted to actuate limit switches (not shown).

The unloading station shown at 20 comprises a mounting plate 200 bolted to the top plate 5 and carrying a hydraulic cylinder 201. The piston rod 202 of the cylinder 201 has bolted thereto a bracket 203 which connects it to an eject shaft 204 vertically slidable in a bearing 205 in the plate 200. The lower end of the shaft 204 has a bore 206 with a piston 207 slidably mounted therein. The piston 207 is urged upwardly by a helical compression spring 208 extending between its head 209 and a step 210 in the bore 206. A transverse bore 212 in the shaft 204 houses two catches 213 arranged to be pressed radially outwardly by the conical lower end of the piston 207. A bore 215 in the shaft 204 permits pneumatic pressure to be applied to the piston 207. An ejection mounted bracket 216 carries a stripper ring 217 and an air distributor ring 218 which has sloping air jets 219 supplied by a peripheral groove 220. A depending bracket 225 bolted to the top plate 5 carries a rotary actuator 226, the shaft 227 of which is mounted in a bearing 228 and carries an unload platform 229 having a depression 230 for receiving molded components. Rotary movement of the platform 229 is limited to 90° by limit switches, one of which is shown at 231.

Figure 7:
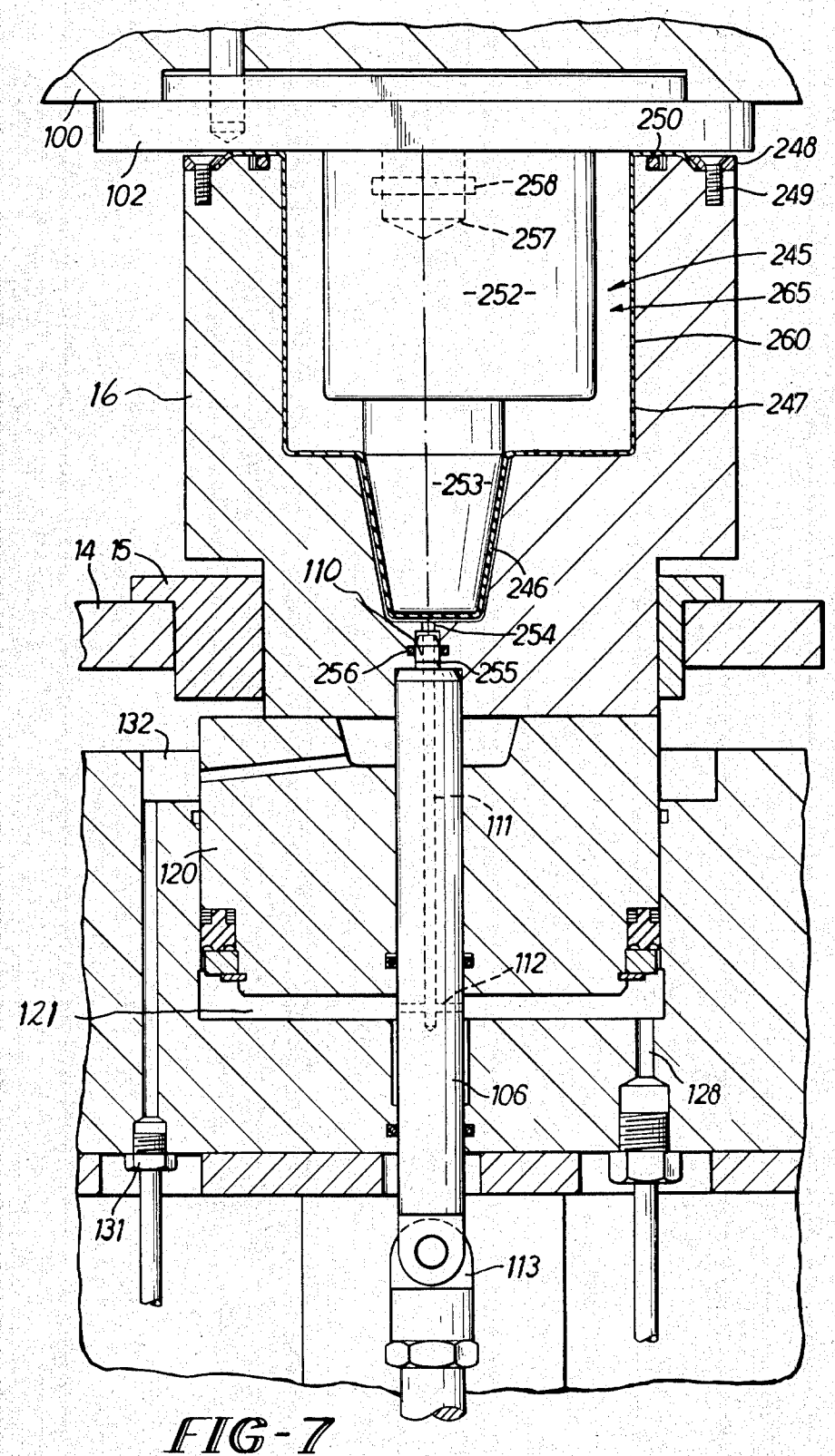
FIG. 7 is a vertical section through part of a slightly modified charging station showing the construction of the mold.

FIG. 7 differs from FIG. 5 in using a simplified piston 120 and in making the lateral bore 112 communicate with the recess 121 so that the same pressure is applied through the probe 110 as is applied to the piston 120. The upper part of FIG. 7 illustrates two forms of mold 16 for producing two different components, the right-hand half of the drawing illustrating the production of a 6 inch diameter component and the left-hand half a 4 inch diameter component. The mold 16 comprises a cylindrical chamber 265 with a tapered recess 246 in its bottom wall. This chamber 265 and its recess 246 are lined with a diaphragm 247 secured by a ring 248 and screws 249 around its periphery, the diaphragm 247 dividing the chamber 265 into an outer mold cavity 260 and inner mold cavity 245. An O-ring seal 250 seals the space between the diaphragm 247 and the chamber wall when the mold is fully clamped in position. Located in the center of the chamber 265 is a mandrel 252 which has a locating boss 253 in the diaphragm-lined recess 246. A bore 254 communicates with the bottom of the recess 246 and has a larger diameter counterbore 255 for receiving the probe 110. The bore 255 has a sealing ring 256. The upper end of the plunger 106 is bevelled and arranged to enter the mold for location purposes as shown. The mandrel 252 has a blind locating hole 257 with a peripheral groove 258.

In operation all three stations operate simultaneously but for convenience the operations carried out on a single mold will be described. The mold 16 starts the cycle at the filling station 18 where it is supported on a bush 15. Actuation of the cylinder 63 inserts the plunger 58 and its probe 59 into the mold 16 and presses it against the delivery tube 52 with the locating pin entering the hole 257. A vacuum is applied to the outer mold cavity 260 through the probe 59 to hold the diaphragm 247 against the chamber wall, and the dispenser 50 then dispenses the powder into the inner mold cavity 245 by way of the insert 53. During filling, the cylinder 77 is operated repeatedly so that the striker ring 72 jogs the mold 16.

After filling, the vacuum is turned off and the plunger 58 retracted to allow the mold to be lowered onto the indexing plate 14 and indexed to the compacting station 19. Here the plunger 106 is then raised by the hydraulic cylinder 114 to the position shown in FIG. 7 for location and initial clamping purposes. Then introduction of hydraulic fluid into the recess 121 pressurizes the piston 120 and thus the mold 16 is pressed against the reaction plate 102 and the diaphragm 247 is pressed against the seal 250. Fluid pressure is then applied to the diaphragm 247 through the probe 110. However, pressure need not be applied to the piston 120 as a separate step but could be applied at the same time as the initial pressure is applied to the outer mold cavity 260 through the probe 110. A higher pressure can be applied to the diaphragm 247 independent of the piston 120. When compression is complete (this is controlled by a time delay) the pressure applied to the diaphragm 247 is decompressed at a controlled rate and a vacuum is applied to pull the diaphragm 247 away from the molding and back onto the chamber wall. The plunger 108 and piston 120 are then lowered thus lowering the mold 16 onto the indexing plate 14 and allowing it to be indexed to the unloading station 20.

At the unloading station 20, the eject shaft 204 is lowered by the cylinder 201 until it enters the hole 257 in the mandrel 252. Pneumatic pressure supplied through the bore 215 urges the piston 207 downwardly and thus the catches 213 radially outwardly. The shaft 204 is then raised carrying with it the mandrel 252 with the molding thereon. The molding is stripped by the ring 217 and air supplied by the jets 219 cleans the mandrel 252. The stripped molding is deposited in the depression 230 in the unload platform 229 which is swung in beneath the mandrel 252 as the latter is raised and swung out again after receiving the molding. The shaft 204 is then lowered to replace the mandrel 252 in the mold 16 and, by relieving the pneumatic pressure therein, the piston 207 is allowed to rise under the action of the spring 208 thus allowing the catches 213 to retract (they have tapered ends so that the weight of the mandrel pushes them in). The shaft 204 is raised and the mold 16 is ready to return to the filling station 18.

The operation of the indexing mechanism 17 will be clear from the above description and drawings. The oscillatory movement of the actuator 160 is converted by the free wheel coupling 156 to the required motion in one rotary direction. The gear ratio between the pinion 154 and the gear 153 is 1 to 1.5 so a 180° motion of the actuator 160 gives the required 120° indexing motion.

A wiper blade (not shown) for the top of the mold is disposed between the filling and compacting stations.

The following are some of the more important features of this machine.

a. the use of three stations to effect the whole cycle b. the use of a pillar of the press as an indexing axis c. the use of an indexing table and tools which move parallel to the indexing axis d. the use of a floating mold particularly one which is lifted from a table and sealed by pressing it against a reaction member, the use of independent pressing and clamping arrangements being especially preferred e. the provision of a facility for applying both fluid pressure and vacuum to the mold f. the use of a seal for the pressure fluid connection, which is part of a floating mold and can be changed with it g. the use of a combined locating plunger and fluid supply probe, especially one in which alignment takes place before the seal comes into effect h. the use of a vacuum to strip the diaphragm i. sealing the bag by forming a flange on the diaphragm which is pressed against a reaction member, the provision of a sealing ring beneath the flange being especially preferred j. the use of a jog mechanism in filling k. removal of a mandrel for stripping, particularly by a probe with catches l. the use of easily removable molds.

One particular application of this machine which is envisaged is the production of metal cylinder liners for internal combustion engines but a very wide variety of articles can be produced from a wide variety of materials.

Referring now to FIGS. 8–15, similar numerals being used to denote similar components, the machine comprises a base 1 carried by feet 2 and carrying a lower housing shown generally at 3. The lower housing carries a bottom plate 4 and a top plate 5 interconnected by four corner posts 6 between which are arranged bolsters 100 and 104. Mounted between the bolsters 100, 104 are a center post 10 and two peripheral posts 11 and 12.

A rotary hub 13 on the center post 10 carries an indexing table 14 having three apertures (one is shown at 15 in FIG. 13) disposed symmetrically around the table. These apertures carry respective molds 16 during operation. The hub 13 is driven by an indexing mechanism shown generally at 17. The indexing table 14 carries each mold 16 in turn to each of three stations, a filling station shown generally at 18, a compacting station shown generally at 19 and an unloading station shown generally at 20.

Figure 10:
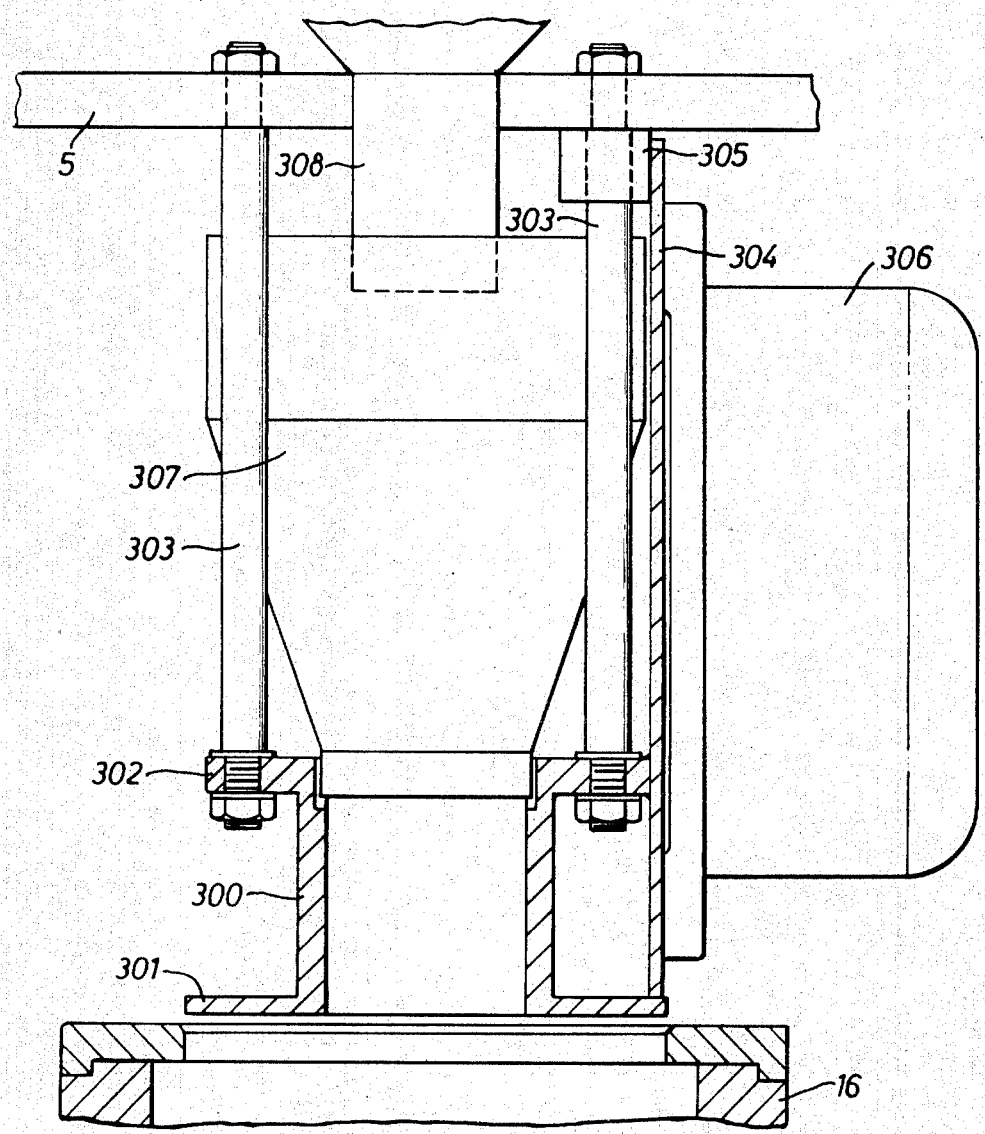
FIG. 10 is a side elevation of part of the filling station of the machine.

The filling station 18 is shown in part in FIG. 10. In FIG. 10, a powder dispenser 50 comprises a circular collar 300 having a circular flange 301 at its lower end and a square flange 302 at its upper end. The collar is suspended from the plate 5 by four bolts 303 (two are shown) and a vertical plate 304 is mounted between the flange 301 and a cross-bar 305 extending between two of the bolts 303. The plate 304 carries a vibratory mechanism 306 for vibrating the collar 300 and thus the mold which is clamped against it in operation. A concentric tube (not shown) may be used to take the vibrations from the collar into the middle of the mold. A funnel 307 is mounted between the bolts 303 and leads into the collar 300. A feed funnel 308 extends through the plate 5 into the upper end of the funnel 307.

Figure 11:
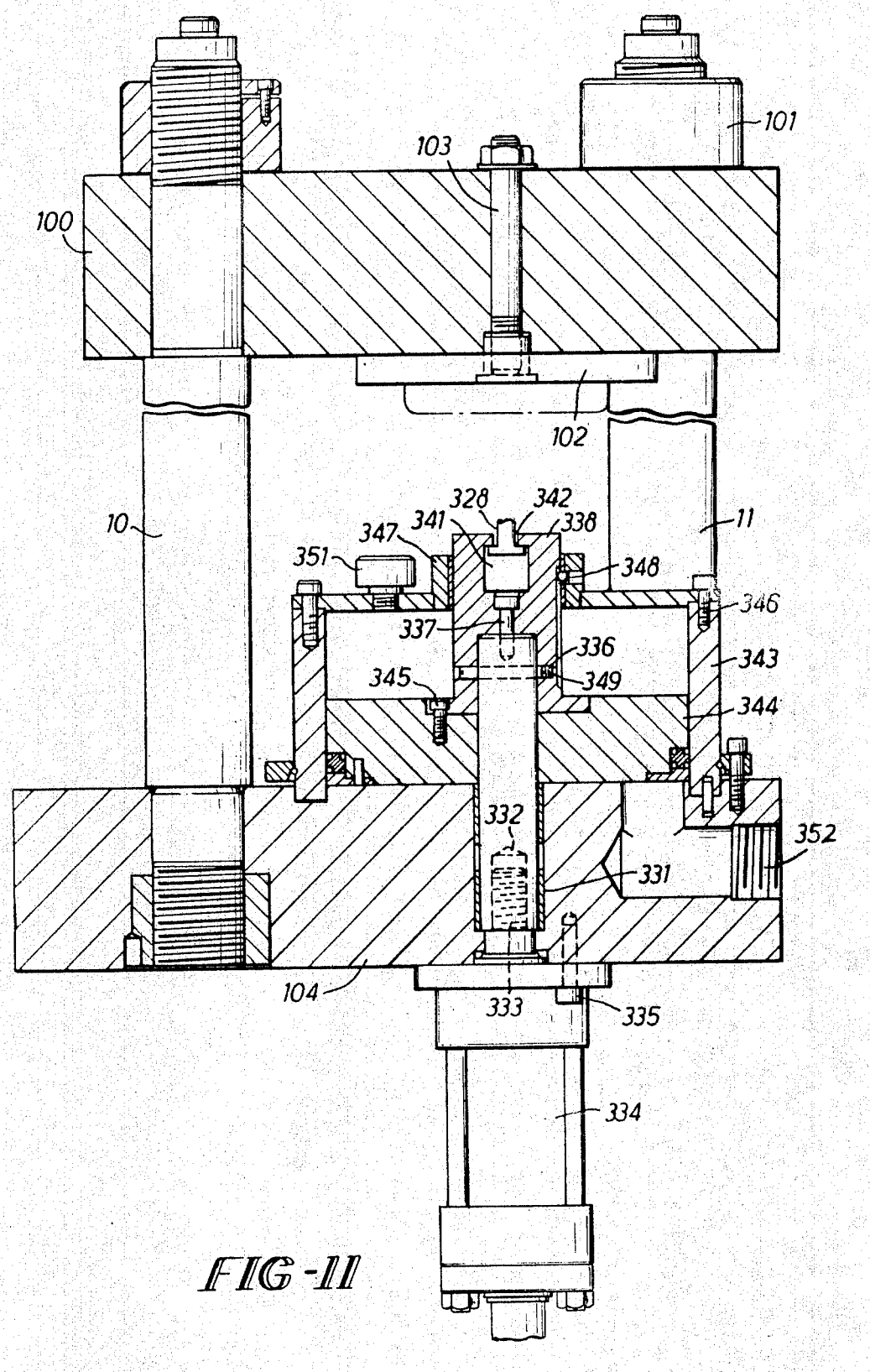
FIG. 11 is a section of the compacting station taken on the line IV—IV of FIG. 9.

The compacting station 19 is shown in FIG. 11 but it will first be appropriate to describe the molds 16 since these differ considerably in form from those described in relation to the first embodiment.

Figure 12:
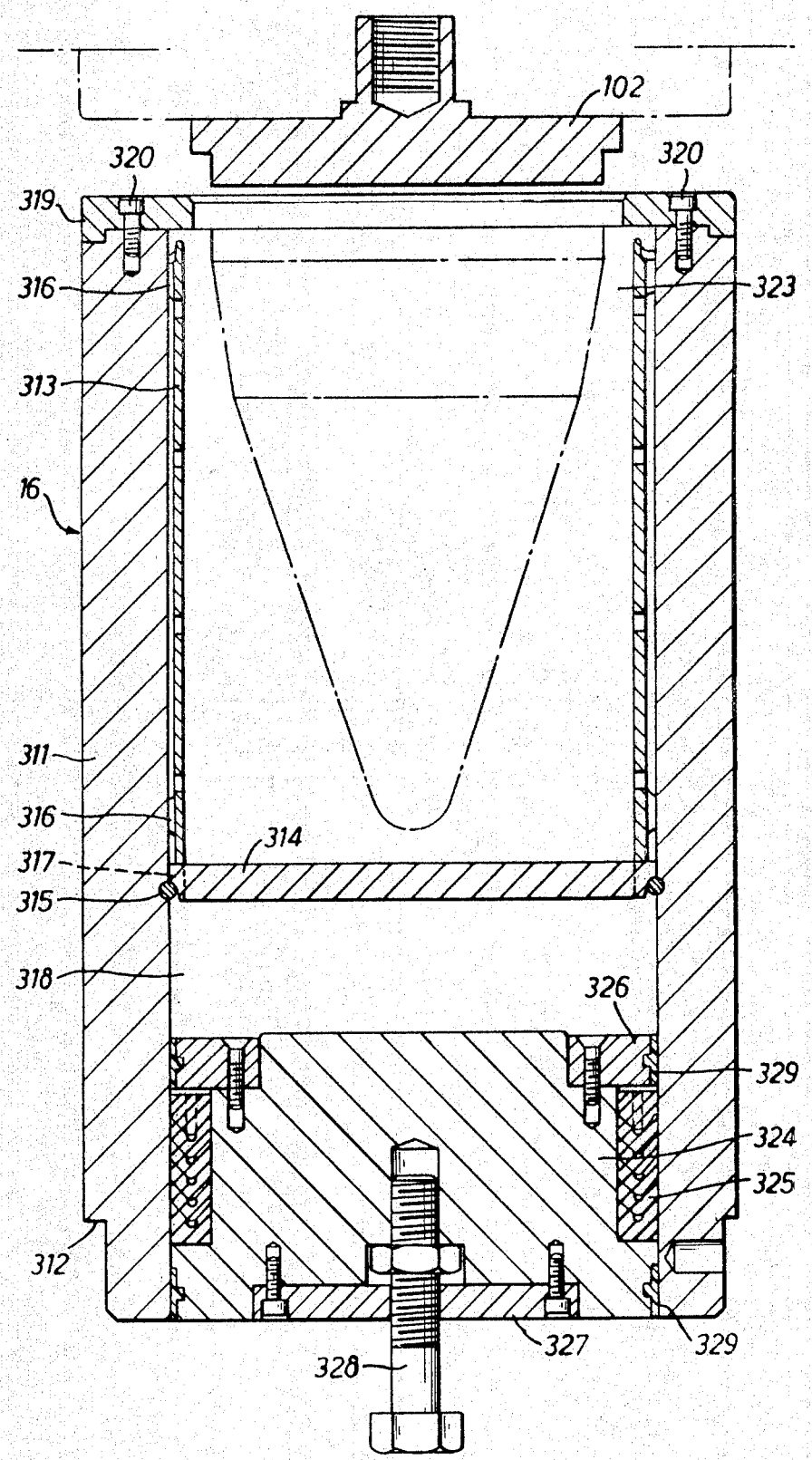
FIG. 12 is a vertical section through a typical mold.
Figure 13:
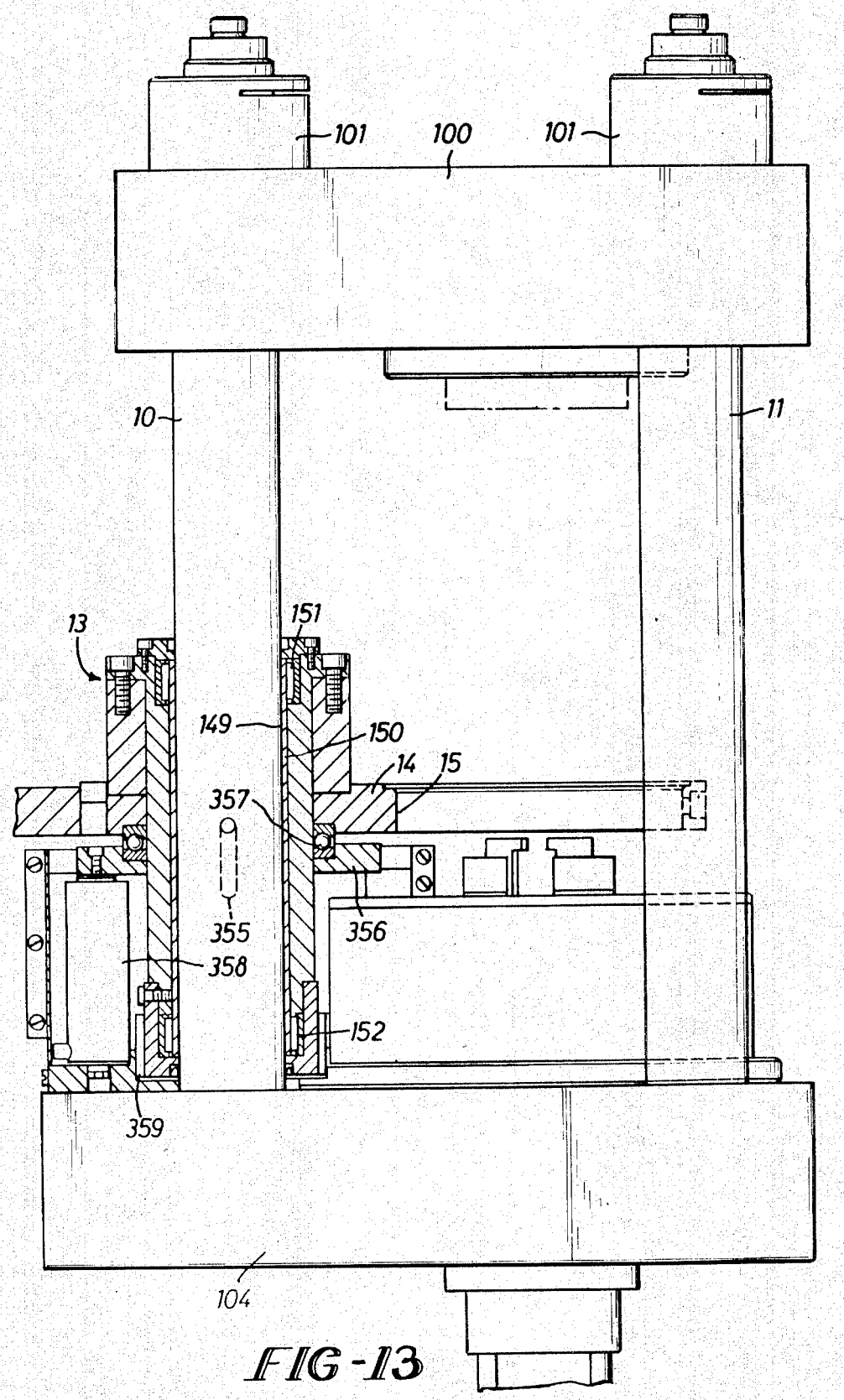
FIG. 13 is a similar view to FIG. 11 showing the indexing table in section and the compacting apparatus in side elevation.

A typical mold 16 is shown in FIG. 12 and comprises a hollow cylindrical block 311 having a step 312 at its lower end so that it can be supported by a table aperture 15. In the upper part of the block 311, an apertured lantern cylinder 313 is supported by a transverse plate 314 which is in turn supported by a ring 315 recessed into the inner wall of the block 311. The lantern cylinder 313 has lugs 316 which space it from the inner wall of the block 311 and the periphery of the plate 314 has recesses 317 providing communication between the space thus formed and the space 318 below the plate 314. A ring 319 retained with bolts 320 clamps the lip of a bag 323 against the upper end of the lantern cylinder 313. A piston 324 having seals 325 is slidable on plastic bushes 329 in the lower end of the block 311. It has a seal retaining ring 326 bolted to its upper surface and a wear plate 327 bolted to its lower surface. Extending through the plate 327 is the head portion of a bolt 328 screwed into the piston 324. The bag 323 has a cylindrical outer shape and a tapered inner shape corresponding to the desired shape of the article to be molded. The space 318 and the space outside the bag 323 are filled with hydraulic fluid so that upward movement of the piston 324 compresses the bag 323. The mold is capable of working up to pressures of about 7,500 p.s.i.

Figure 8:
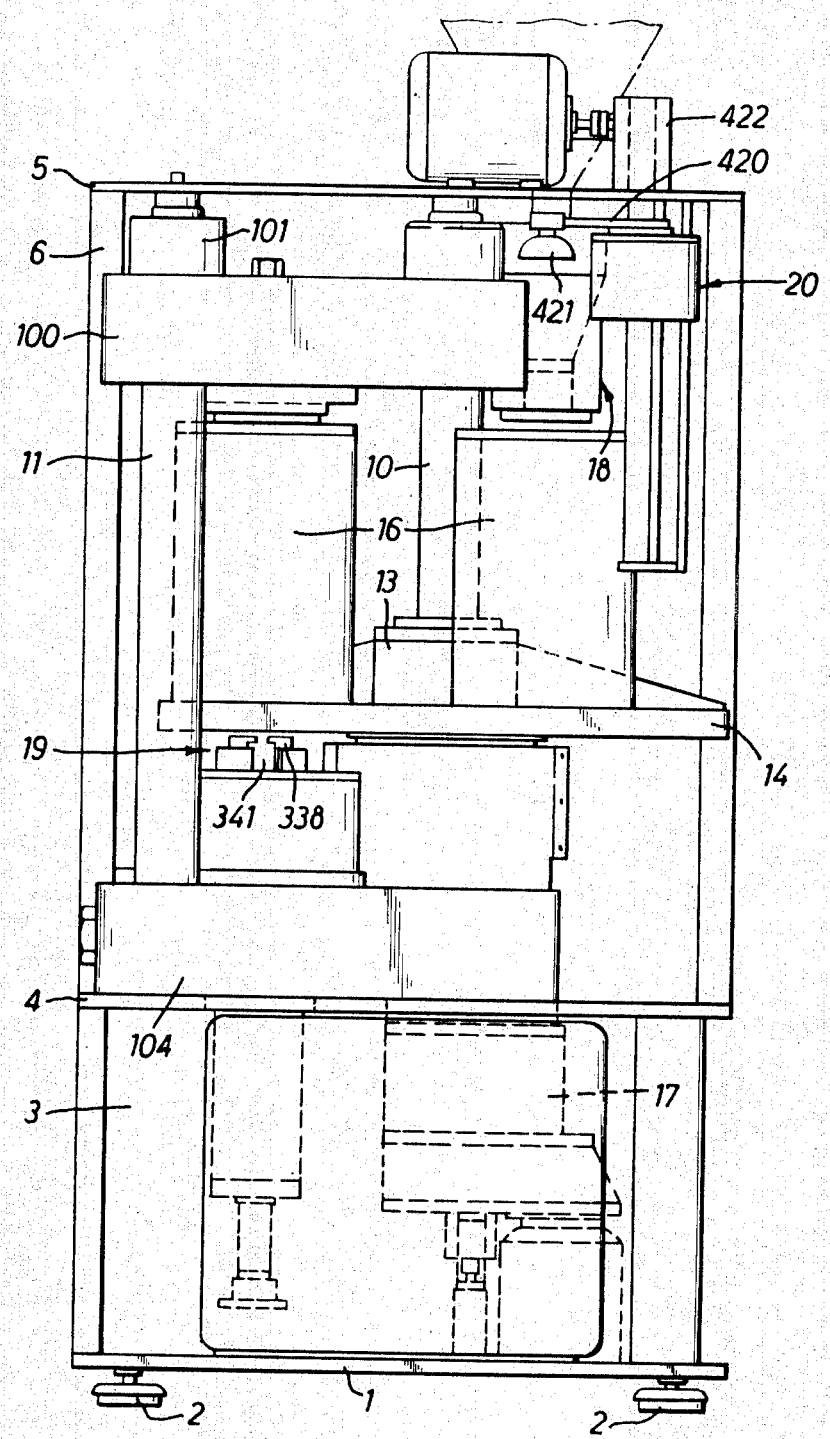
FIG. 8 is a side elevation of another embodiment of the machine.
Figure 9:
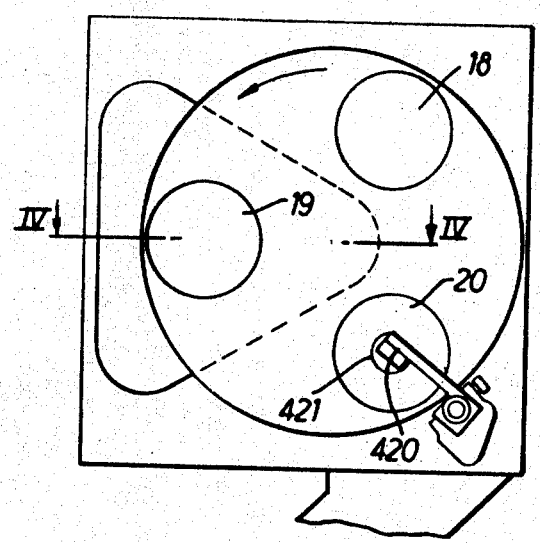
FIG. 9 is a diagrammatic plan view of the machine of FIG. 8.

The compacting station 19 is shown more clearly in FIG. 11 but FIGS. 8 and 9 should also be referred to. Mounted on the stepped upper ends of the posts 10, 11, and 12 is the generally triangular upper bolster 100 which is secured in place by screwed collars 101 and carries a generally circular reaction plate 102 by means of a bolt 103. The similar lower bolster 104 is secured to the bottom plate 4. In a passage 331 extending through the bolster 104 is disposed a vertically reciprocable plunger 332. Screwed into a bore in the lower end of the plunger 332 is a piston rod 333 of a hydraulic cylinder 334 bolted to the underside of the bolster 104 by bolts one of which is shown at 335. Mounted on the upper end of the plunger 332 and secured to it by a transverse pin 336 and a vertical bolt 337 is an adapter 338 having a transverse channel 341 with a restricted mouth 342. The purpose of this channel is to receive the head of the mold bolt 328 as it is rotated into the compacting station during indexing. Recessed into the bolster 104 and surrounding the plunger 332 is a cylinder 343 in which is reciprocably mounted a piston 344 bolted to the adapter 338 by bolts one of which is shown at 345. The cylinder 343 is closed at the top by a plate 346 bolted thereto and provided with a central collar 347 through which the adapter 338 reciprocates. A ball 348 mounted in the collar 347 cooperates with a groove 349 in the adapter 338 to limit movement of the adapter. The space above the piston 344 is in communication with the atmosphere through a cowled vent 351 and the space below the piston is connected to a passage 352 in the bolster 104. Thus, with a mold in position, the adapter 338 can be raised to abut against the wear plate 327 by the cylinder 334 and the large diameter cylinder 343 can then be pressurized to fully compress the charge in the mold 16. Pressure can be released at the required rate and the mold bag 323 can be finally returned to its original position (thus disengaging it from the molded product) by forced retraction of the plunger 332.

In this embodiment of the invention the indexing table 14 and the three molds which it carries is raised into an operative position after each forward movement and is subsequently lowered before the next forward movement. This raising and lowering clamps the molds against the flange 301 of the filling station and the plate 102 of the compacting station the channel 341 in the adapter 338 being of sufficient depth to accomodate this movement.

Figure 14:
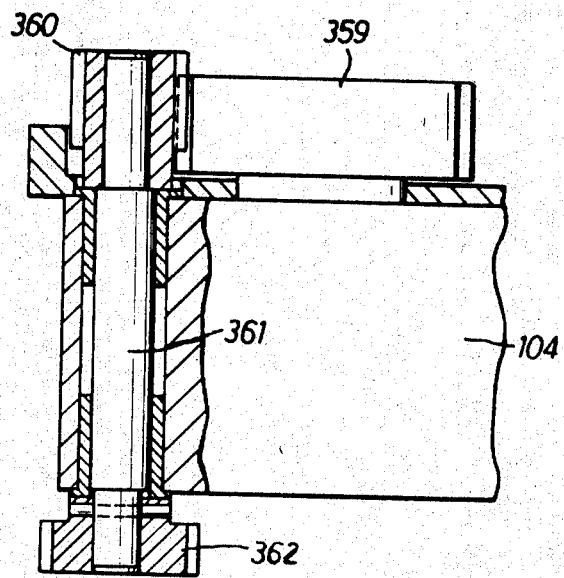
FIG. 14 is a section through a pinion shaft assembly.
Figure 15:
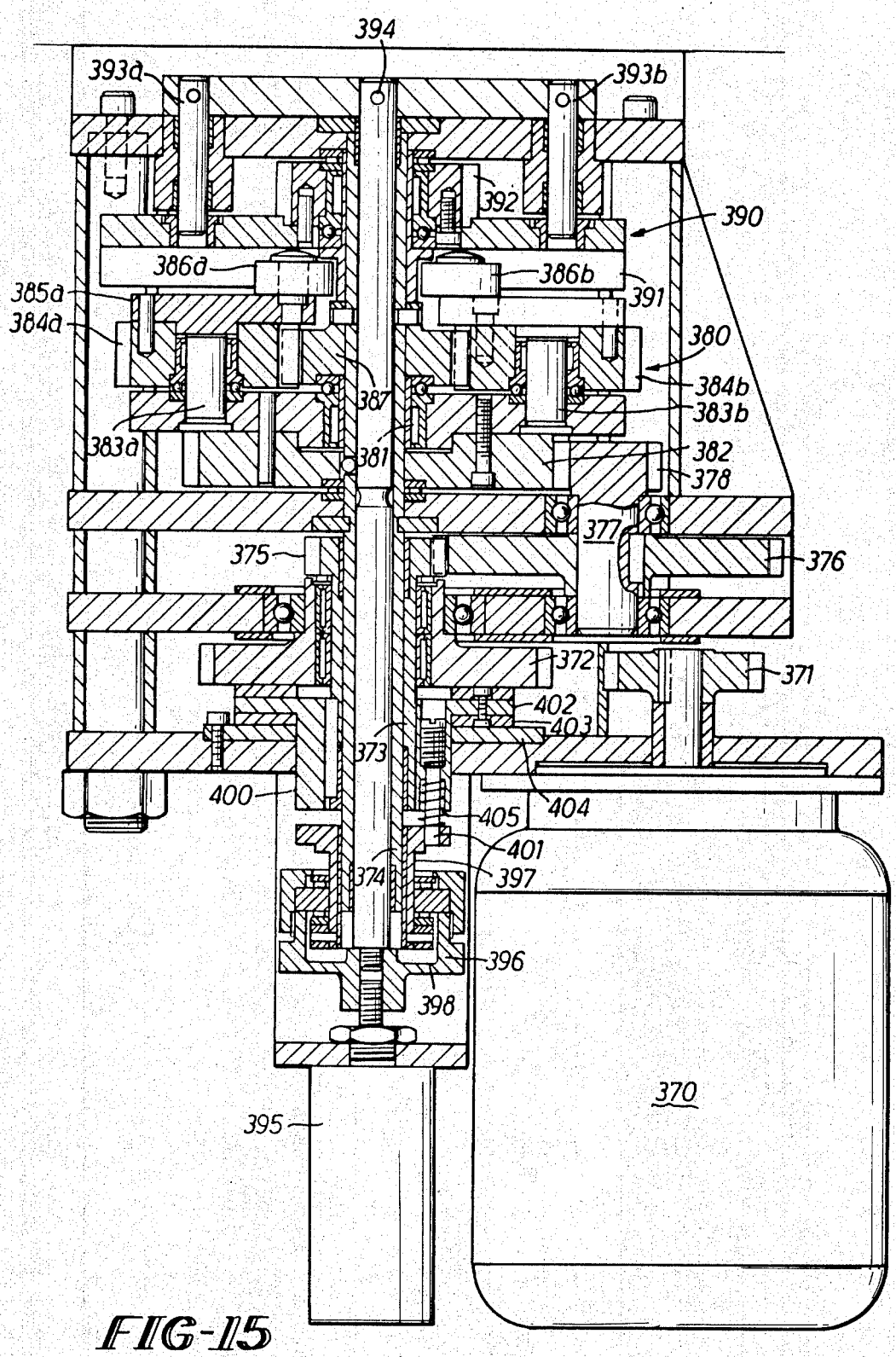
FIG. 15 is a vertical section through an indexing mechanism.

The hub 13 comprises a cylindrical member 150 journalled by bearings 151 and 152 to a sleeve 149 vertically slidable on the center post 10. The sleeve 149 is free to slide vertically on the center post 10 within limits set by a vertical slot 355 in the sleeve 149 which is engaged by a pin on the post 10. A non-rotatable annular bearing plate 356 is disposed below the table 14 and carries it by means of a ball thrust bearing 357. The plate 356 is in turn supported by three hydraulic jacks one of which is shown at 358. These jacks 358 rest on the bolster 104 and it will be seen that when extended they will lift the table 14 and the molds 16 carried thereby. The lower part of the cylindrical member carries a gear 359 which is engaged with an indexing pinion 360 (FIG. 14) throughout its vertical movement. The pinion 360 is carried on a shaft 361 passing through the bolster 104 and carrying a further pinion 362 at its lower end (FIG. 14). Many indexing mechanisms can be used but we prefer an indexing mechanism as shown in FIG. 15. An electric motor 370 drives a gear 371 which drives a gear 372 through an idler gear (not shown). The gear 372 is mounted on sleeve 373 which is rotatable about a hollow fixed central shaft 374 and which carries a gear 375. The gear 375 engages a gear 376 keyed on a shaft 377 carrying a gear 378. A drive assembly shown generally at 380 is mounted on the shaft 374 by a bearing 381 and has pinned to it a gear 382 in engagement with the gear 378. The assembly 380 comprises two diametrically opposed stub shafts 383a, 383b on which are rotatably mounted gears 384a, 384b. To these gears 384a, 384b are secured cranks 385a, 385b carrying rollers 386a, 386b. The gears 384a, 384b are in constant mesh with a fixed gear 387 keyed to the shaft 374 so that when the drive assembly 380 is rotated, the cranks 385a, 385b, in addition to their planetary movement, rotate in the same direction as each other at the same speed but 180° out of phase, and perform one rotation for each rotation of the drive assembly 380. A driven assembly 390 is rotatable about the shaft 374 and comprises a diametrical channel 391 in which the rollers 386a, 386b run and a gear 392 from which the final drive is taken to pinion 362 (FIG. 14). In the illustrated position the planetary rotation of the rollers 386a, 386b cancels out their overall rotation and the rotation of the drive assembly over a substantial angle has little or no effect on the driven assembly 390. Thereafter (assuming a constant speed for the drive assembly), the speed of the driven assembly 390 rises gradually to a maximum with the rollers 386a, 386b in their outermost position and falls gradually to zero as the illustrated position is again approached. The arrangement not only provides good acceleration and deceleration for indexing but also prevents overrun as the driven assembly 390 cannot drive the drive assembly 380. Locking pins 393a, 393b hold the driven assembly in position between indexing movements and can be withdrawn by upward movement of a rod 394 slidable in the shaft 374 under the action of a pneumatic cylinder 395. The cylinder 395 lifts the rod 394 by means of a non-rotary intermediate member 396 which carries a rotary assembly 397 through a thrust bearing 398. The assembly 397 is connected to a sleeve 400 which is splined onto the sleeve 373, by four pins one of which is shown at 401. The sleeve 400 carries a clutch ring 402 and a brake ring 403, the clutch ring 402 being engageable with the gear 372 and the brake ring 403 with a fixed disc 404. Energisation of the cylinder 395 therefore lifts the assembly 397 and (through springs 405 on the pins 401) the sleeve 400 thus applying the clutch ring 402 to the gear 372 and permitting the gear to drive the sleeve 373 and thereby the drive assembly 380. Deenergisation permits the sleeve 400 to fall back and stop rotation of the sleeve 373 by engagement of the brake ring 403 with the disc 404. The pins 393a, 393b simultaneously drop into the locking position. This arrangement permits the motor 370 to be run continuously.

The unloading station 20 shown in FIG. 8 includes a "pick and place" unit described hereinafter. This includes an arm 420 provided with a suction cup 421 and movable up and down and around a column 422. The programme is so arranged that the cup 421 picks up the molded article from the mold, rotates about the column and deposits the article onto suitable conveying means.

The operation of the machine is essentially similar to that of the first embodiment.

Since many changes and variations of the described embodiment of the invention may be made without departing from the inventive concept it is not intended to limit the invention otherwise than as required by the appended claims.

What is claimed is:

1. Apparatus for compacting particulate material into a coherant body, said apparatus comprising:
   a. a plurality of molding assemblies each comprising a body with a cavity, a resilient member mounted in said cavity and providing with said cavity a first chamber, said resilient member including a hollow interior providing a second chamber forming an upwardly open-ended molding cavity, said molding cavity being sealed from said first chamber, said body further including one part of a male and female telescoping joint, and conduit means for providing a fluid flow path between said one part of said joint and said first chamber;
   b. means forming a plurality of work stations including at least a filling station and a compacting station;
   c. support means to receive and support each of said molding assemblies, said support means being movable with respect to said work stations;
   d. drive means connected to said support means and operative to periodically move said support means about a vertical axis to shift each of said molding assemblies from a position aligned with one of said work stations to a position aligned with another of said work stations, said drive means being operative to impart to said support means periodic periods of motion with intervening periods of non-motion;
   e. said filling station comprising particulate material dispensor means having a portion for closing and sealing the open end of said molding cavity, said portion being upwardly offset from said molding cavity open end during periods of motion of said support means;
   f. said compacting station comprising closure means operative to close and seal said open end of said molding cavity, and said closure means being upwardly offset from said molding cavity open end during periods of motion of said support means;
   g. first hollow probe means including a mating part of said telescoping male and female joint and operative, during periods of non-motion of said support means, to move said mating part of said joint into telescoping engagement with said one part of said joint to cause one of said molding assemblies to move upwardly off of said support means and into engagement with said portion of said dispensor means to cause the latter to seal said open end of said molding cavity to permit filling of said molding cavity with particulate material from said dispensor;
   h. second hollow probe means including a mating part of said telescoping male and female joint and operative, during periods of non-motion of said support means, to move said mating part of said joint into telescoping engagement with said one part of said joint to cause one of said molding assemblies to move upwardly off of said support means and into engagement with said closure means to cause the latter to seal said open end of said molding cavity to form a closed mold cavity for compaction of particulate material therein;
   i. evacuating means operably connected to said first probe means for applying a vacuum to said first chamber to draw said resilient member into snug engagement with said body cavity; and
   j. means operably connected with said second probe means for introducing a non-compressible liquid through said second probe means and said conduit means into said first chamber to uniformly force said resilient member against a charge of particulate material contained in said molding cavity to compact the particulate charge into a coherant body.

2. The apparatus of claim 1, further comprising means operative to vibrate said molding assemblies when the latter are in engagement with said portion of said dispensor means to ensure complete filling of said molding cavity with particulate material.

3. Apparatus for compacting particulate material into a coherant body, said apparatus comprising:
   a. a molding assembly comprising a body with a cavity, a resilient member mounted in said cavity and providing with said cavity a first chamber, said resilient member having an open ended hollow interior providing a molding cavity, said molding cavity being sealed from said first chamber, said body including at least one conduit in fluid communication with said first chamber, and said body including a recess in fluid communication with said conduit;
   b. means forming a plurality of work stations including at least a filling station and a compacting station;
   c. means operative to move said molding assembly between said work stations;
   d. said filling station comprising particulate material dispensor means having a portion for closing and sealing the open end of said molding cavity;
   e. first probe means operative to enter said molding body recess and move said molding assembly tightly against said dispensor means portion to seal the open end of said molding cavity, said first probe means including a conduit in fluid communication with said molding body conduit when said first probe is disposed in said recess, and means operative to evacuate said conduits, thereby evacuating said first chamber to pull said resilient member tightly against said body cavity during filling of said molding cavity at the filling station;
   f. said compacting station comprising closure means operative to close and seal said open end of said molding cavity; and
   g. second probe means operative to enter said molding body recess and move said molding assembly tightly against said compacting station closure means to seal the open end of said molding cavity to form a closed mold cavity for compaction of particulate material therein, said second probe means including a conduit in fluid communication with said molding body conduit when said second probe means is disposed in said recess, and means operative to pump a substantially incompressible fluid through said conduits into said first chamber to uniformly force said resilient member against particulate material in said molding cavity to compact the particulate material into a coherent body.

4. Apparatus for compacting a mass of particulate material into a coherent body, said apparatus comprising:
   a. a molding assembly including a molding body having a cavity, a resilient liner member in said cavity adjacent the wall thereof, said liner having a hollow interior providing an open-ended molding cavity,
   b. means forming a compacting station including a closure member to engage and close off the open end of said molding cavity;
   c. means within said molding body forming a reservoir for containment of an incompressible fluid, one end wall of said reservoir being relatively fixed against movement, and an opposite end wall of said reservoir being movable through said reservoir toward said one end wall to vary the volume of said reservoir, conduit forming means extending from said reservoir to said molding body cavity; and
   d. movable means operative to press said closure member against said open end of said molding cavity to close and seal the latter, said movable means further being operative, when pressing said closure member against said molding cavity open end, to cause said opposite end of said reservoir to move toward said one end of said reservoir to decrease the volume of said reservoir to pump the incompressible fluid through said conduit forming means and into said molding body cavity to compress said liner against particulate material in said molding cavity to compact the particulate material therein into a coherent body.

5. A self-contained portable isostatic molding assembly comprising:
   a. a block having a through bore;
   b. a plate mounted in said bore to divide the latter into first and second longitudinally offset chambers, said second chamber being adapted to receive and retain a supply of hydraulic fluid, and said plate being provided with fluid passages;
   c. resilient means having a cavity for receiving particulate material, said resilient means being mounted in said first chamber, and said cavity being open to one end of said bore for feeding particulate material into said cavity;
   d. a perforated sleeve mounted in said first chamber about said resilient means, said sleeve being spaced apart from said bore to provide an annular chamber for reception of hydraulic fluid for applying pressure to said resilient means;
   e. a piston movably mounted in said second chamber and operable to be moved toward said plate to force hydraulic fluid through said fluid passages and into said annular chamber and to pressurize the hydraulic fluid; and
   f. means sealing an interface between said piston and said bore against hydraulic fluid leakage.

* * * * *

UNITED STATES PATENT OFFICE
CERTIFICATE OF CORRECTION

Patent No. 3,806,302　　　　　　　　　Dated April 23, 1974

Inventor(s) Keith Airey

It is certified that error appears in the above-identified patent and that said Letters Patent are hereby corrected as shown below:

In Col. 2, line 46, after "hub" please insert --13--;

In Col. 4, line 1, "mounted" should read --mounting--.

Signed and sealed this 1st day of October 1974.

(SEAL)
Attest:

McCOY M. GIBSON JR.　　　　　　　　C. MARSHALL DANN
Attesting Officer　　　　　　　　　　Commissioner of Patents